(12) United States Patent  
Kobayashi

(10) Patent No.: US 7,125,595 B2  
(45) Date of Patent: *Oct. 24, 2006

(54) MULTIPLE-COMPONENT MAGNETIC MAT

(75) Inventor: Seiin Kobayashi, Yonezawa (JP)

(73) Assignee: Milliken & Company, Spartanburg, SC (US)

( * ) Notice: Subject to any disclaimer, the term of this patent is extended or adjusted under 35 U.S.C. 154(b) by 247 days.

This patent is subject to a terminal disclaimer.

(21) Appl. No.: 10/460,576

(22) Filed: Jun. 12, 2003

(65) Prior Publication Data

US 2004/0013849 A1    Jan. 22, 2004

Related U.S. Application Data

(63) Continuation-in-part of application No. 10/104,553, filed on Mar. 22, 2002, now abandoned.

(60) Provisional application No. 60/388,334, filed on Jun. 13, 2002.

(51) Int. Cl.
*B32B 33/00* (2006.01)
*B32B 3/02* (2006.01)
*B32B 3/06* (2006.01)
*B32B 3/16* (2006.01)

(52) U.S. Cl. ............... 428/67; 428/77; 428/78; 428/81; 428/82; 428/88; 428/95; 428/101; 428/900

(58) Field of Classification Search ............... 428/95, 428/87, 101, 900, 67, 77, 78, 81, 82, 88; 15/215, 216, 217
See application file for complete search history.

(56) References Cited

U.S. PATENT DOCUMENTS 4,184,304 A * 1/1980 Merchant .................. 52/746.1
4,397,900 A 8/1983 Higgins ...................... 428/95
4,405,674 A * 9/1983 Kyle .......................... 428/96
4,671,981 A * 6/1987 McLaughlin ................ 428/95
4,716,065 A * 12/1987 McLaughlin ................ 428/95
5,524,317 A 6/1996 Nagahama et al. ........... 15/217
5,752,357 A 5/1998 Piller ..................... 52/747.11
5,797,860 A * 8/1998 Moriyasu ................... 601/30
5,919,540 A 7/1999 Bailey ....................... 428/67
6,219,876 B1 4/2001 Blum ......................... 15/215
6,250,001 B1 * 6/2001 Gillespie .................... 40/600
2002/0132085 A1 * 9/2002 Higgins et al. ............... 428/95
2002/0142126 A1 * 10/2002 Higgins et al. ............... 428/95
2003/0180499 A1 * 9/2003 Kobayashi et al. ........... 428/95
2004/0053002 A1 * 3/2004 Kobayashi et al. ........... 428/95
2004/0093811 A1 * 5/2004 Oakey et al. ................. 52/177
2005/0253018 A1 * 11/2005 George, Jr. ............... 244/118.5

FOREIGN PATENT DOCUMENTS

| DE | 40 16939 A1 | 11/1991 |
| DE | 29718920 U1 * | 1/1998 |
| EP | 0 343 271 | 5/1988 |
| EP | 0 653 179 | 11/1994 |

(Continued)

*Primary Examiner*—Cheryl A. Juska  
(74) *Attorney, Agent, or Firm*—Terry T. Moyer; Charlotte C. Wilson

(57) ABSTRACT

A multi-component floor mat that, in one embodiment, is comprised of a first base or frame portion, intended to be positioned on the floor, that is dimensioned to accommodate a second flexible textile mat or rug portion that is releasably held in place on or in said base or frame portion by a plurality of magnets associated with one or both portions, thereby allowing for the easy removal or replacement of the textile portion of the mat and the economical laundering of same.

8 Claims, 11 Drawing Sheets

FOREIGN PATENT DOCUMENTS

| | | | | |
|---|---|---|---|---|
| JP | 54028413 A | * | 3/1979 | |
| JP | 60-118774 | | 6/1985 | |
| JP | 01266035 A | * | 10/1989 | |
| JP | 01266036 A | * | 10/1989 | |
| JP | 02302275 A | * | 12/1990 | |
| JP | 03199473 A | * | 8/1991 | |
| JP | 07292938 A | * | 11/1995 | |
| JP | 08114021 A | * | 5/1996 | |
| JP | 11137404 A | * | 5/1999 | |
| WO | WO8404898 A1 | * | 12/1984 | |
| WO | WO 2003106161 A1 | * | 12/2003 | |
| WO | WO 2003106747 A2 | * | 12/2003 | |

* cited by examiner

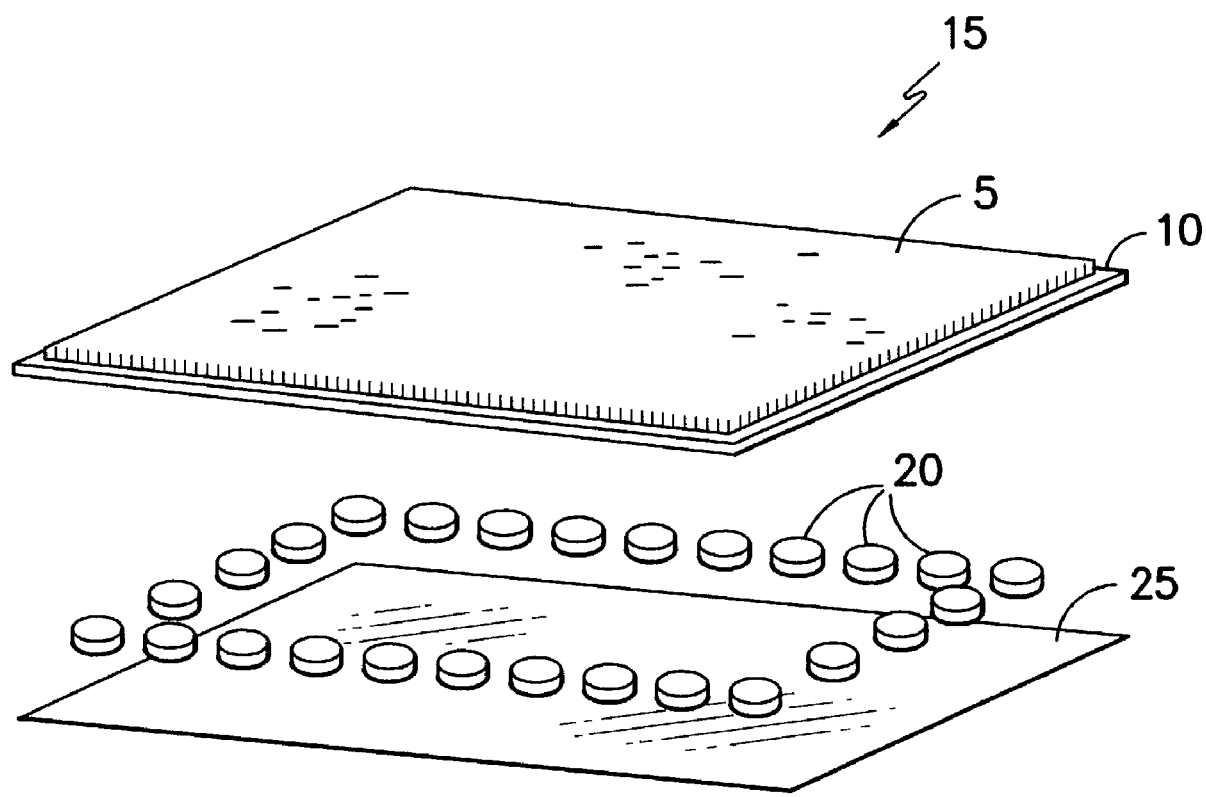
FIG. —1—

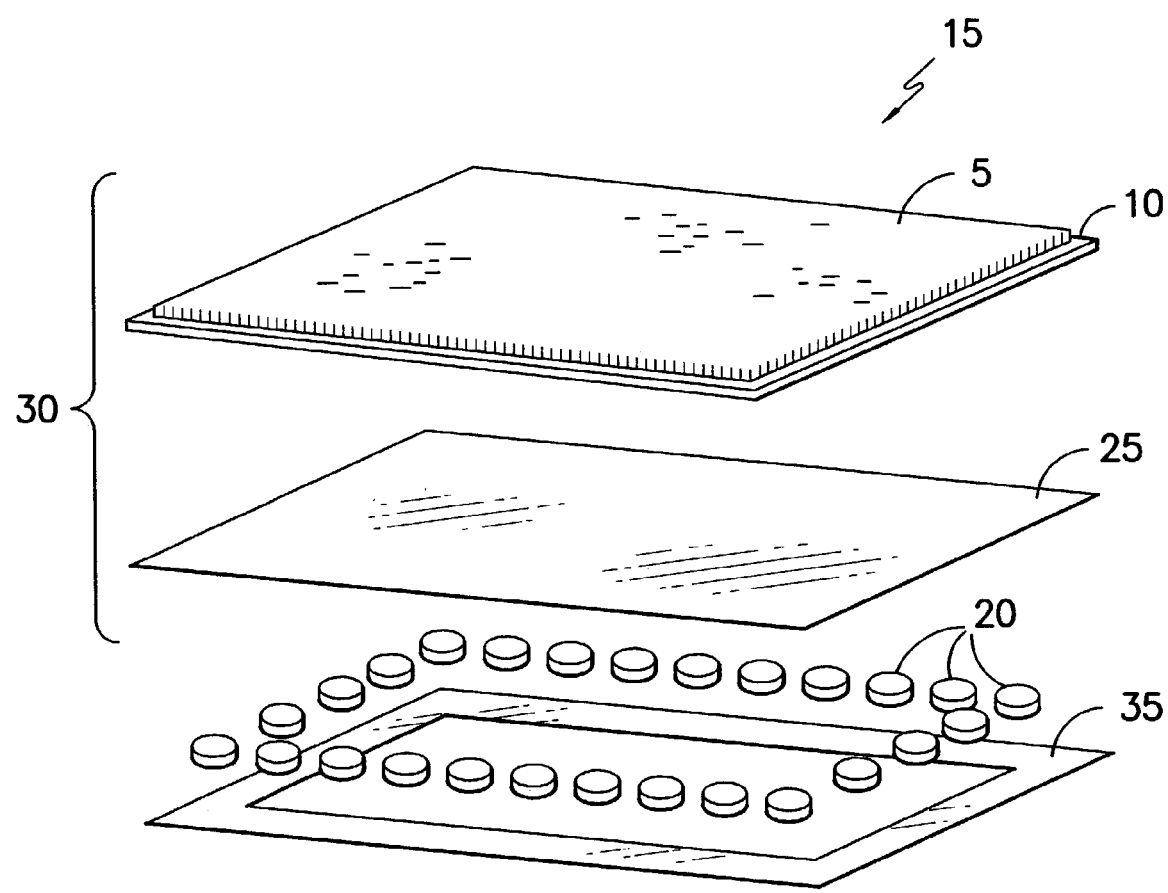
FIG. -2-

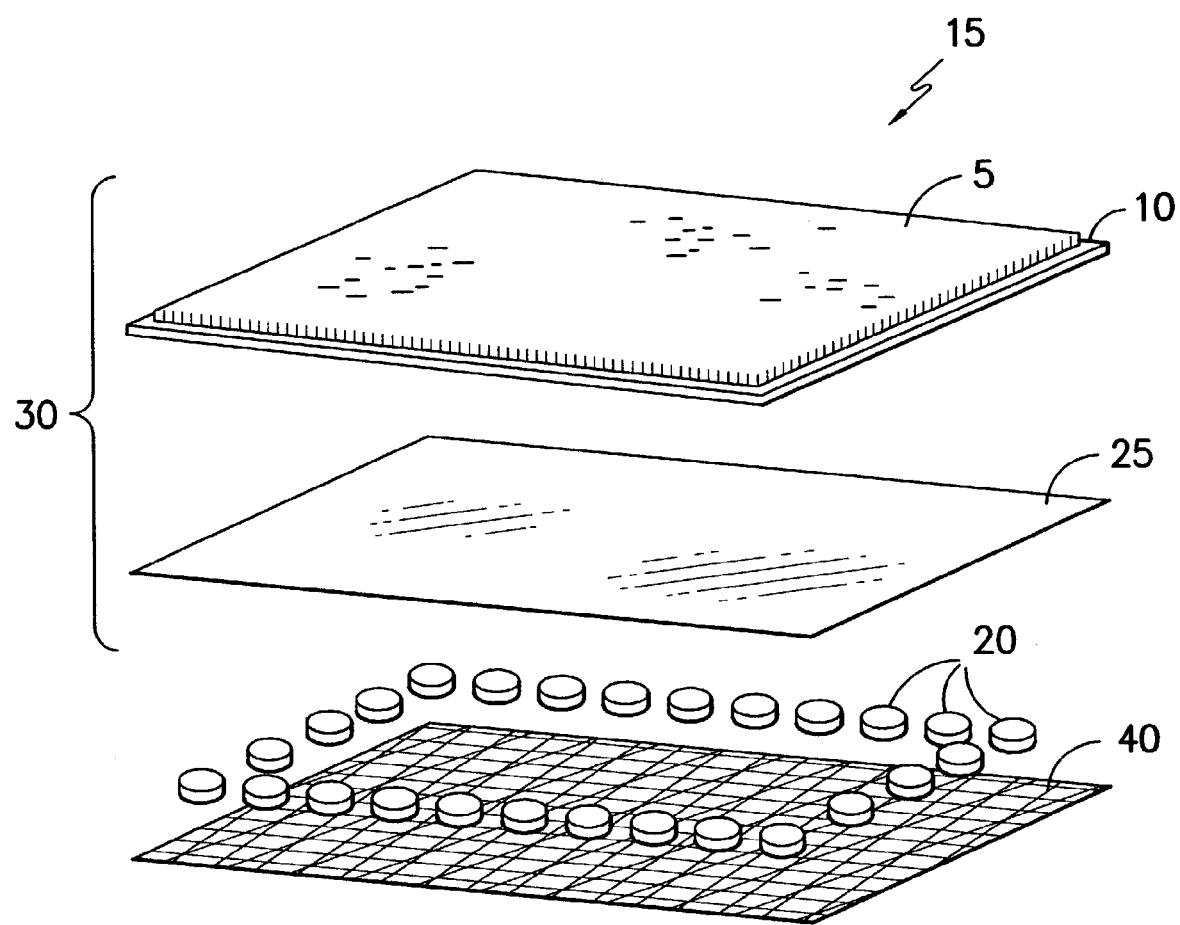
FIG. -3-

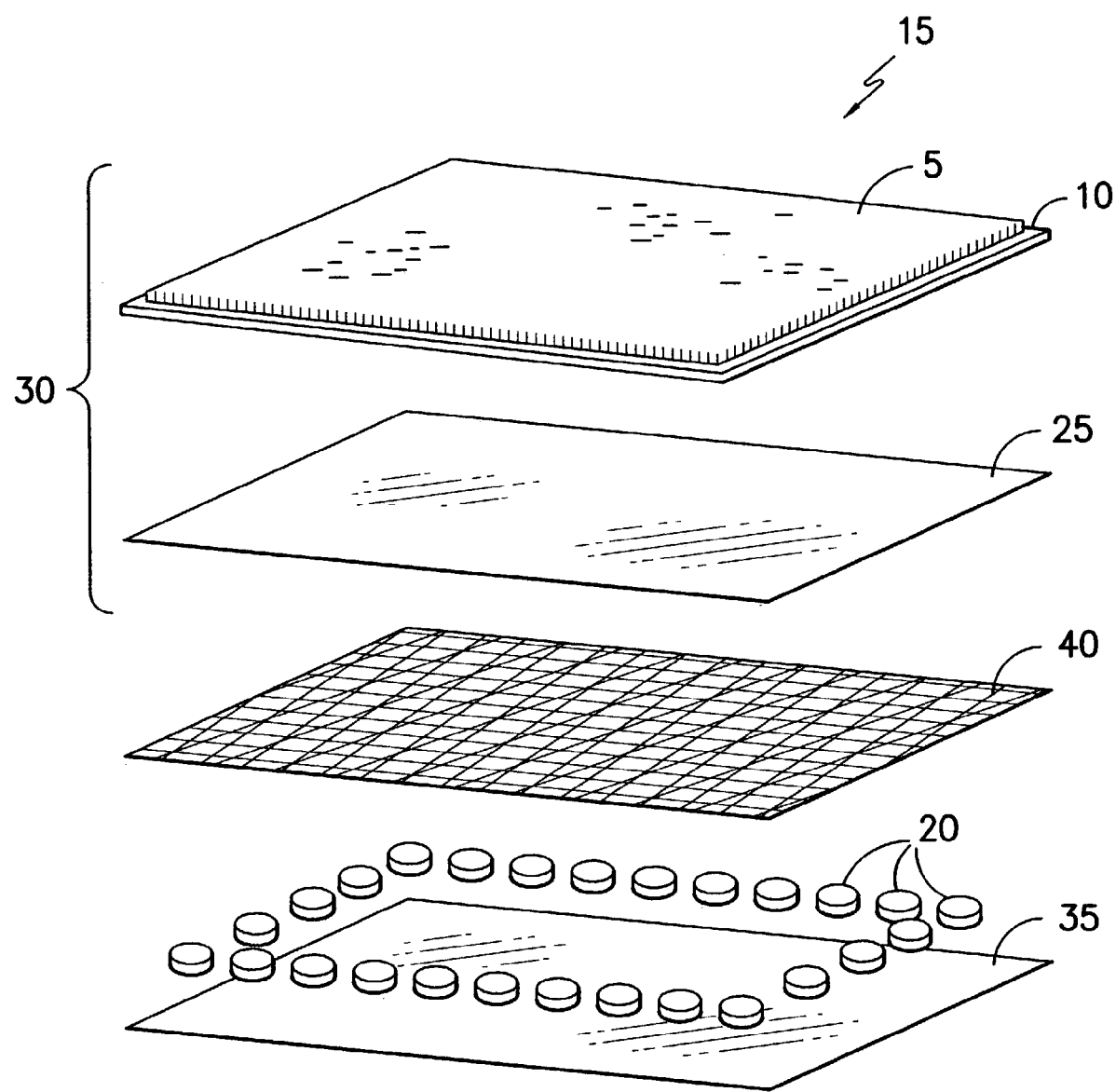
FIG. —4—

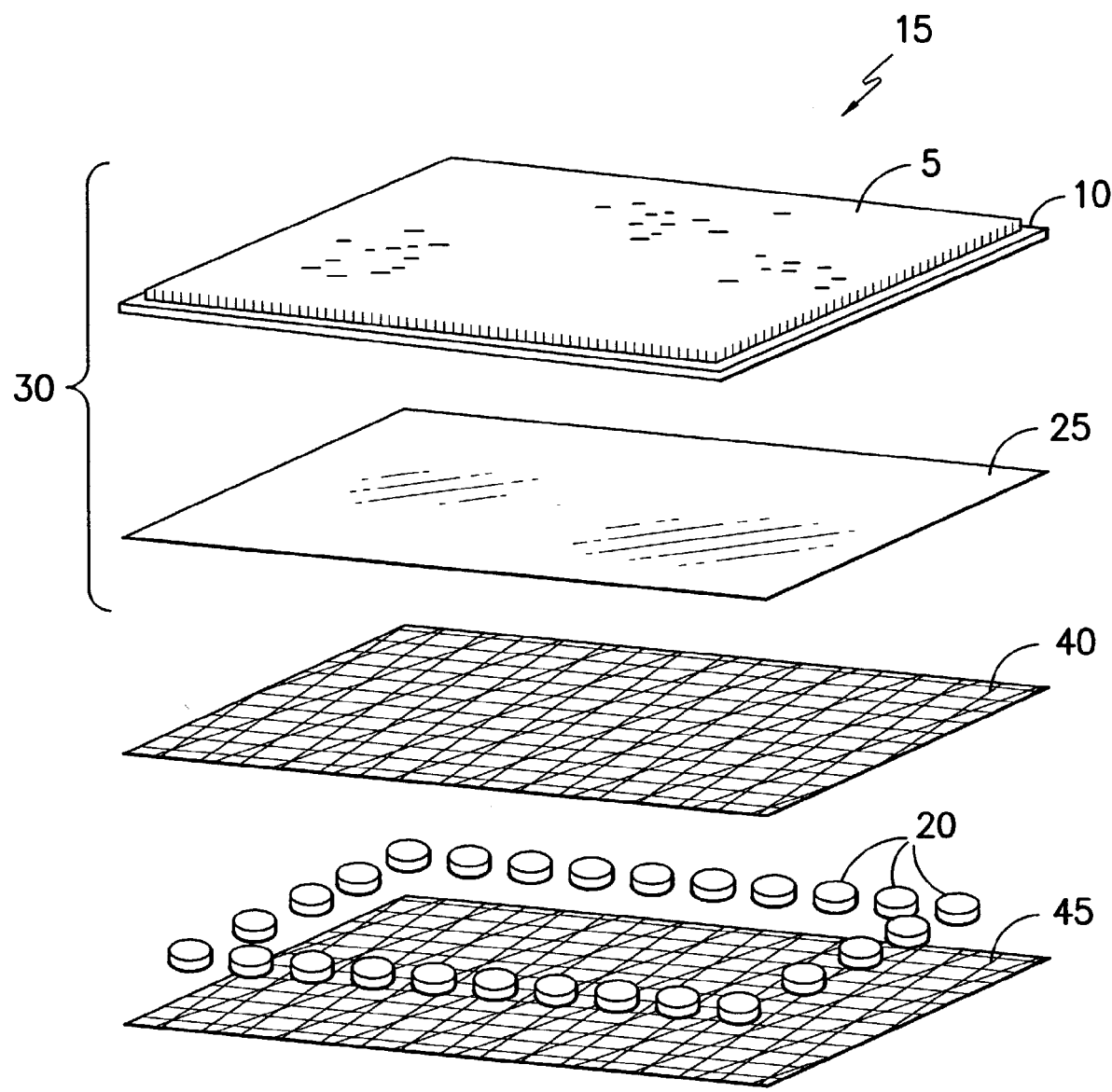
FIG. -5-

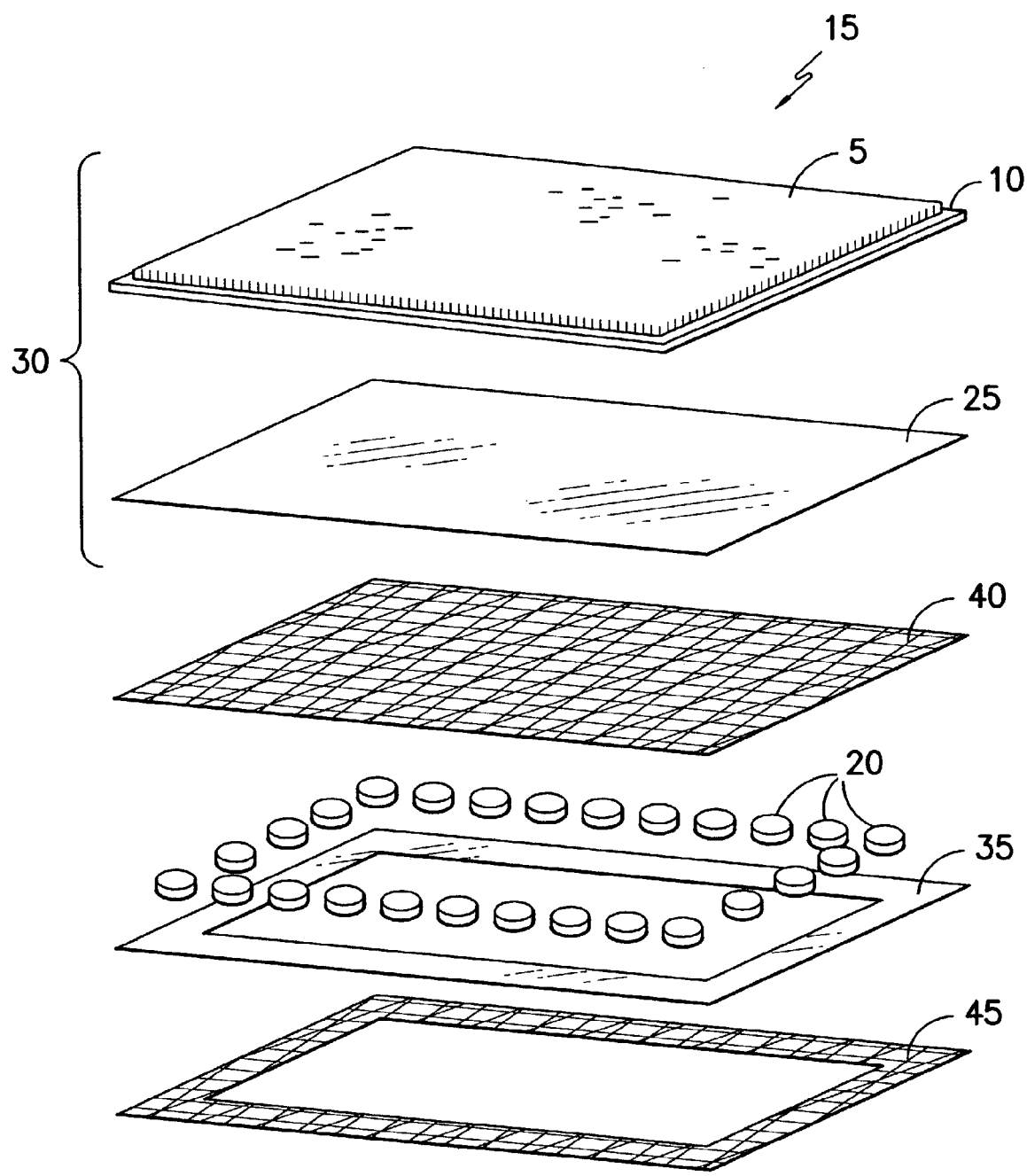
FIG. —6—

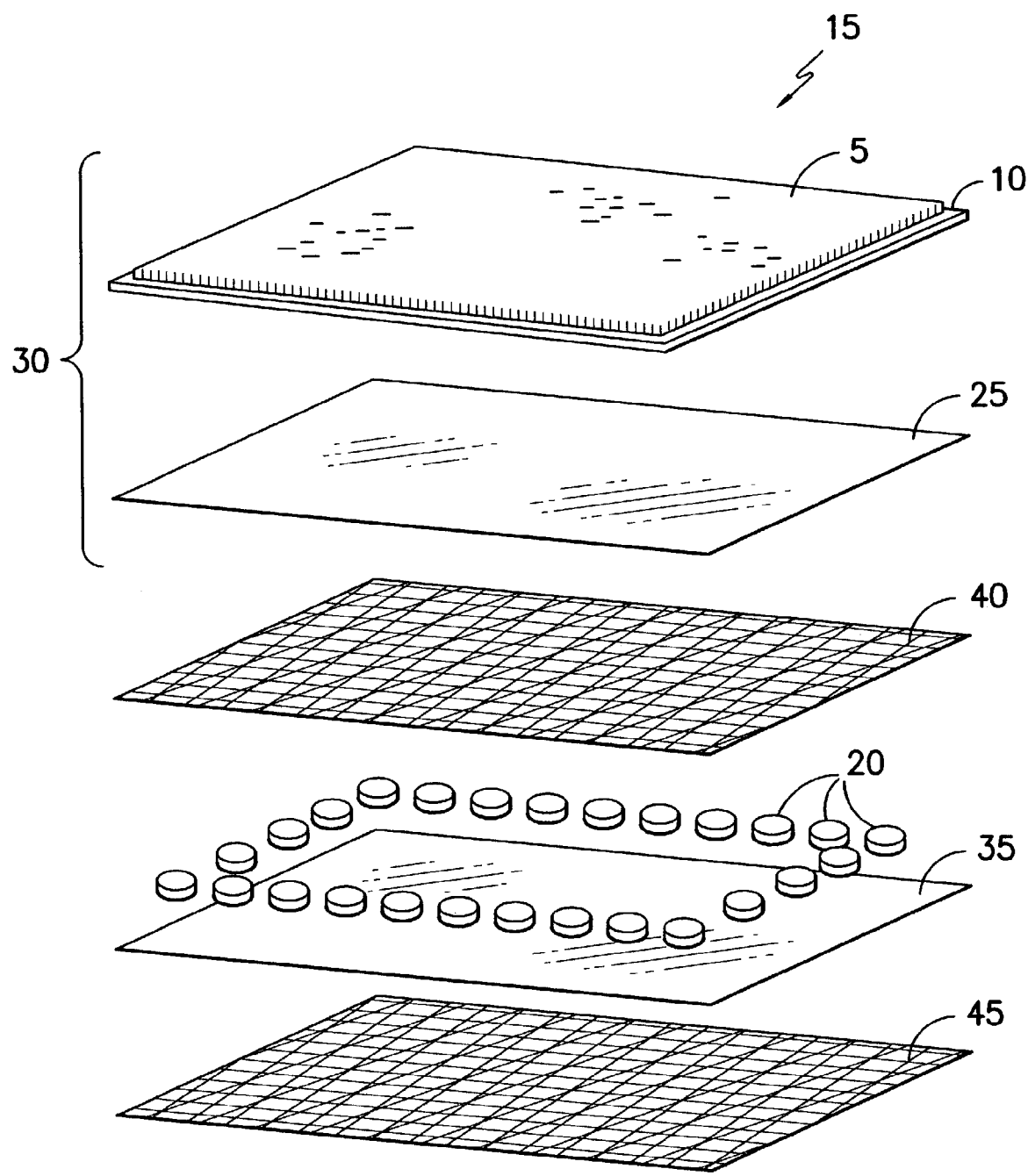
FIG. —7—

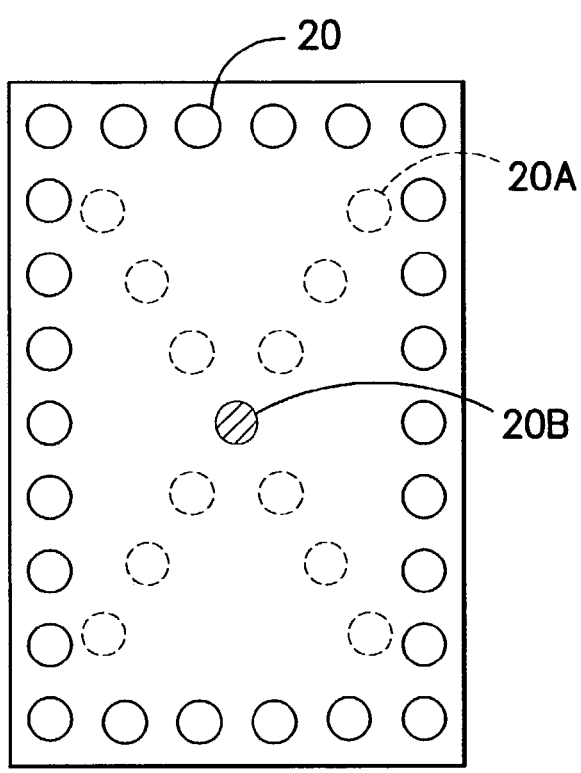
FIG. -8-
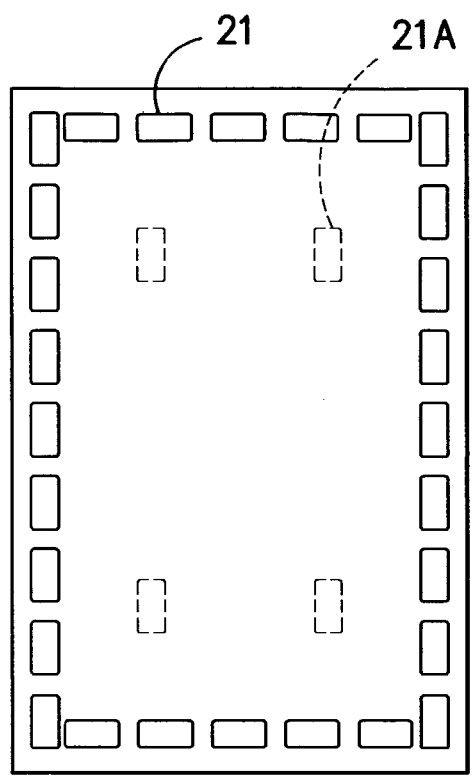
FIG. -9-
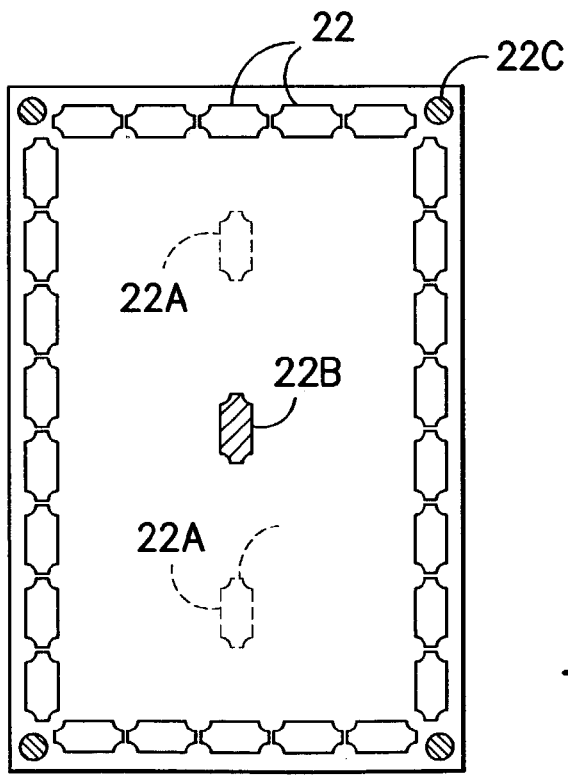
FIG. -10-

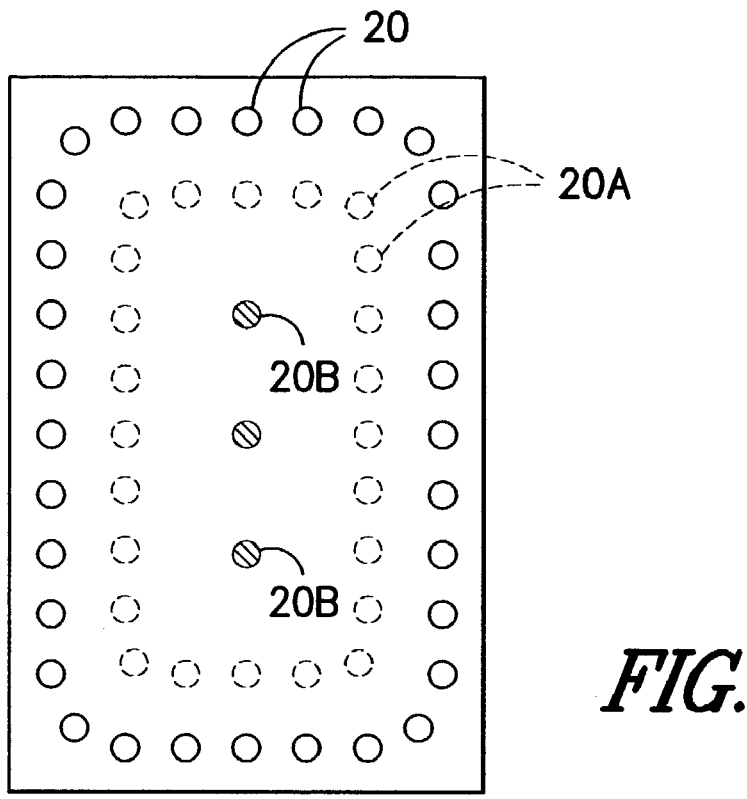
FIG. -11-
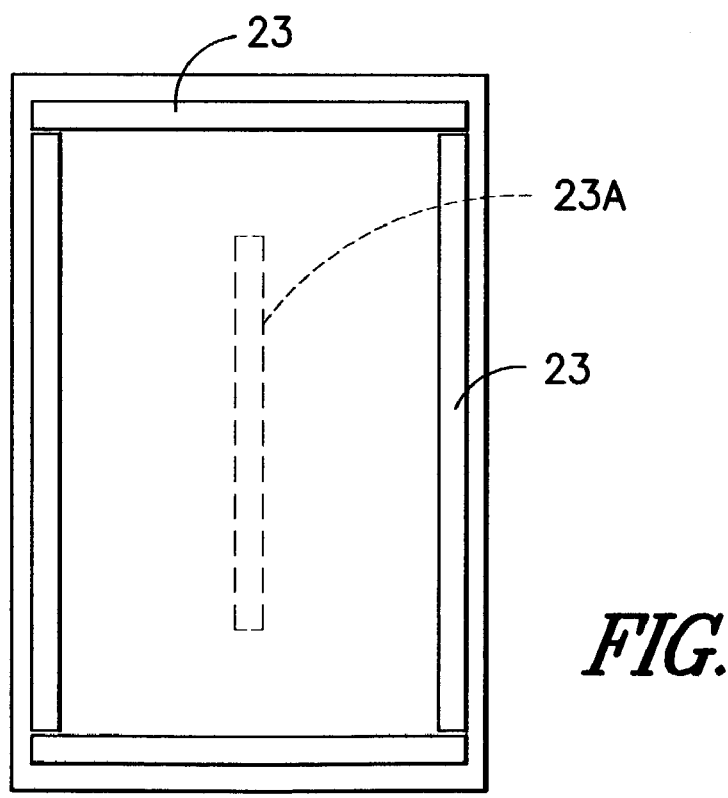
FIG. -12-

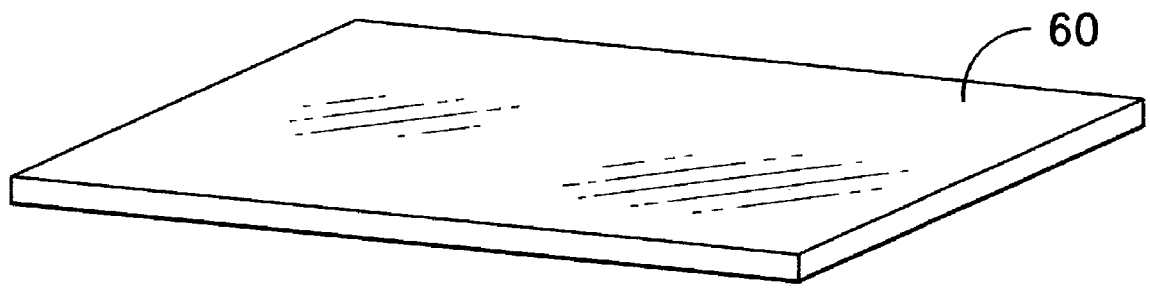
FIG. -13-
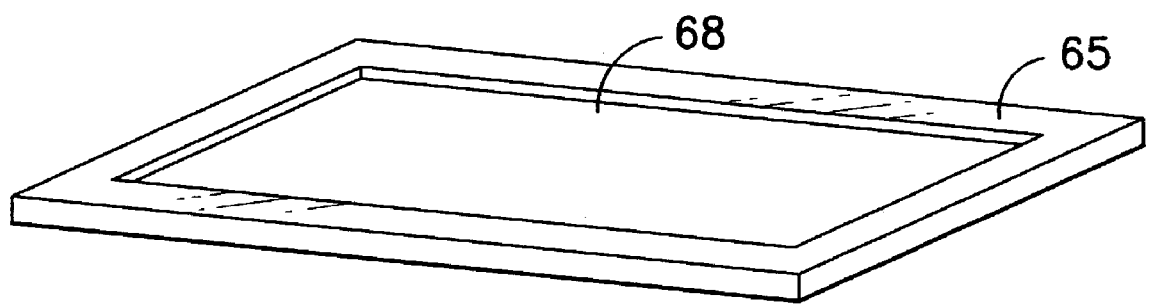
FIG. -14-

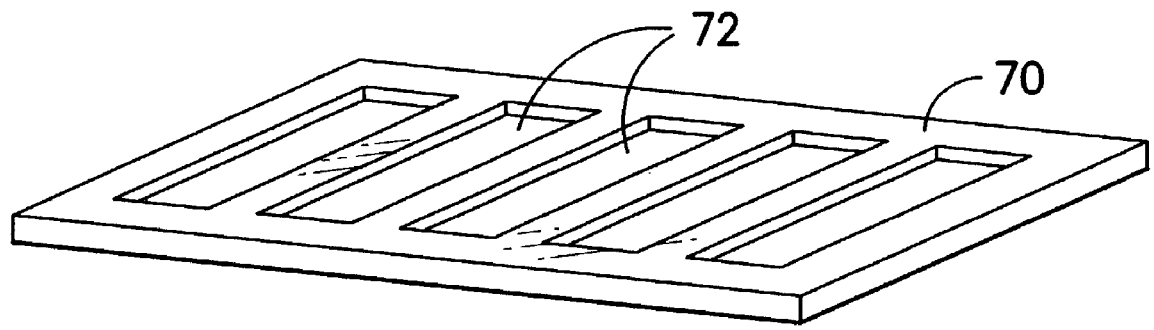
FIG. -15-
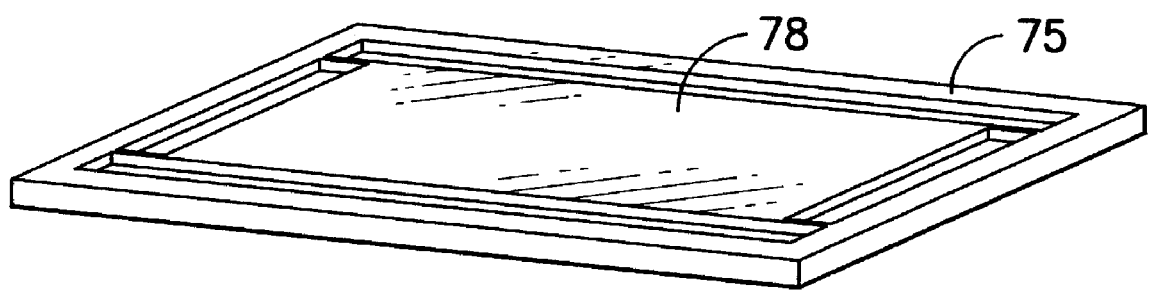
FIG. -16-

MULTIPLE-COMPONENT MAGNETIC MAT

CROSS-REFERENCE TO RELATED APPLICATIONS

This application claims priority to U.S. provisional application Ser. No. 60/388,334, filed Jun. 13, 2002, and is a continuation-in-part of U.S. patent application Ser. No. 10/104,553, filed Mar. 22, 2002 now abandoned.

TECHNICAL FIELD

The present invention relates to a floor mat made of separable components. More specifically, the invention relates to a multi-component floor mat that, in one embodiment, is comprised of a first base or frame portion that is dimensioned to accommodate a second flexible textile mat or rug portion that is releasably held in place on or in said base or frame portion by a plurality of magnets associated with one or both portions.

BACKGROUND

Dust-control mats, typically used in or near entrances in retail and industrial buildings, offices, and residences, can be classified into two types, according to their essential construction: a unitary mat and a separable mat. Mats of both types are commonly used in industrial laundry businesses that rent the mats to customers for a period of time and then recover, wash, regenerate and re-rent the mat, to the same or to a different customer.

In the case of unitary mats, the base or floor portion and the textile mat portion are constructed as a unitary, inseparable structure. When such mats are used In the industrial laundry business, both portions of the mat—including the base portion (typically made of a relatively thick layer of rubber or similar material)—must be recovered, transported to and from the customer location, washed and regenerated, even though it is likely that only the textile portion requires laundering. Having to include the relatively heavy base or floor portion of the mat in these various operations causes significant and needless inefficiencies due to the additional weight and bulk contributed by the base or floor portion, including the considerable energy costs associated with transporting and washing such mats.

In order to reduce these inefficiencies, and to provide additional flexibility and variety in the choice of the textile portion of the mat, separable mats have been developed. These mats typically are comprised of a base portion and a separate, removable textile portion that is adapted for fitting in or on the base portion. The heavier, bulkier base portion can then remain in place, while the lighter, less bulky textile portion can be removed or exchanged for laundering or, for example, for the purpose of changing the appearance of the mat as an interior design element in a customer's building. Because only the relatively lightweight, compact textile portion need be serviced, industrial launderers can achieve significant economies during the collecting, laundering, and re-distributing processes that such laundries routinely undertake during the lifetime of the textile portion of the mat, and substantial cost savings can be realized if the relatively heavy and bulky base portion can be left in place.

The concept on which such separable mats are based is that the base portion, being made of rubber or the like, can remain in place on a semi-permanent basis once it is placed in the desired location. Thereafter, the textile portion of the mat can be replaced or exchanged as housekeeping or interior design needs arise. Accordingly, in addition to a reduction in the inefficiencies referred to above, an interchangeable system of mats can be produced to meet a variety of user needs and specifications, making it possible to offer a wide variety of mats at relatively modest cost, and allowing for easy replacement or substitution of the textile portion of the mat.

The separable mat, however, requires some mechanism to provide secure and reliable attachment between the base portion and the textile portion. If such mechanism is ineffective, the textile portion of the separable mat can exhibit turned-up edges, ripples, and/or mis-alignment with the base portion, all of which can result in conditions that are both unsightly (due to mat misalignment, curling, or the like) and unsafe (due to the tripping hazard presented by such turned-up edges, ripples, or other surface irregularities). Additionally, such mats provide impaired ability to remove soil, moisture, or debris from shoes, thereby adversely affecting the essential functionality of the mat.

In order to assure adequate and dependable attachment between the base portion and the textile portion of such mats, and thereby eliminate unsightliness as well as a principal cause of tripping, several methods for detachably securing the base portion to the textile portion have been developed. These methods include, among others, (1) use of a face fastener; (2) use of combination of rough surfaces; (3) use of a mechanical fastening device; (4) use of a chemical adhesion agent; and (5) use of a magnetic material.

One physical and partial adhesion mechanism based upon a hook-and-loop fastener has generally been used as disclosed in, for example, Japanese Patent Publication No. 7450/1984. Described in detail, a female loop portion of the fastener is installed on the back surface of the textile portion of the mat, while a male hook portion of the fastener is installed on the upper surface of the base. Typically, when used with mats that are generally square or rectangular in shape, such fasteners are installed in the corners and along the sides of the mat. However, such placement is unable to avoid wrinkling, which can develop when non-adhered portions of the sides are contacted by the foot traffic. Such wrinkling, and the resulting tripping hazard it presents, can have a dramatic, adverse effect on the safety and appearance of the mat. When the face fastener is used along the entire side of the mat, or substantially so, the mat may become undulated after repetitive washing due to a difference in the shrinkage between the mat fabric and the fastener portion. Regardless of the positioning of the fastener, such fasteners tend to add undesirable thickness and bulk to the mat, thereby causing lumps, depressions, or other surface irregularities in the mat and, where the mat is used near a door with minimal floor clearance, interference with the smooth operation of the door. It has also been observed that such fasteners tend to lose their binding effectiveness, i.e., their adhesion strength, with repeated launderings. In addition, from the standpoint of manufacturing steps, the face fastener must be stitched after the fabric is prepared, thereby increasing the manufacturing cost.

In the case of an attachment mechanism using rough surfaces or a mechanical fastening device, a shape must be formed on the back surface of the fabric that inevitably results in an increase in cost and weight. Moreover, such mechanisms are associated with other shortcomings: an effective adhesive force is difficult to obtain in the vertical direction, the roughened portions themselves become worn out through repetitive laundering of the fabric, and the fabric on the surface tends to deteriorate (wear out), causing the life of the mat to be shortened.

In the case of an attachment mechanism using a releasable adhesive material, the adhesive force decreases upon the infiltration of rain, sand and the like, making it difficult to maintain reliable and effective attachment between the mat portions under all weather conditions.

In contrast with the above-mentioned adhesion methods, the adhesion using magnetic materials maintains an adhesive force favorably and stably against changes in an external environment and varies little even after repeated laundering.

Several attachment mechanisms using magnetic materials already have been proposed for the purpose of releaseably securing together the portions of a separable mat. Such mechanisms are described in, for example, Japanese Laid-Open Patent Publication No. 28413/79, Japanese Laid-Open Utility Model Publication No. 16976/1984, Japanese Laid-Open Utility Model Publication No. 95079/1985 and Japanese Laid-Open Patent Publication No. 118774/1985, and European Patent Specification EP 0653179 B1.

As used herein, the term "magnetically active" shall be used to refer to a material that is or that forms a magnet, i.e., it generates a magnetic field. The term "magnetically passive" shall be used to refer to a material that is attracted to a magnet but that cannot, of itself, generate a magnetic field. The term "magnetically interactive" shall refer to a material that is either magnetically active or magnetically passive. The term "magnetically complementary" shall be used to describe magnetically interactive materials that, when brought into close physical proximity, generate or establish an attractive force between the materials. Pairs of magnetically complementary materials include a magnet and a ferrous material (e.g., iron) or, alternatively, a first magnet and a second magnet having a pole orientation that causes it to be attracted to the first magnet.

When using magnetic forces to releasably attach separable mat components, it is important that the textile or removable portion be securely fastened to the base or floor portion. To achieve this result, it is generally understood that the adhesion surface preferably should be smooth and the gap between the opposing magnetically interactive materials in the respective mat portions preferably should be as small as possible, so as to maximize the strength of the attractive forces generated by the magnet(s). In the case of a mat on which pile yarns are implanted, however, it is difficult to completely avoid the unevenness caused by the stitching of pile yarns on the primary backing layer associated with the back surface of the fabric. When an ordinary magnetic material is used, therefore, it is in many cases difficult to establish a sufficiently strong and uniform attachment.

The above-mentioned problem can be solved to some extent by using magnetically active materials that generate a strong magnetic force. In rental mats, however, it is difficult to employ a magnetic material having a particularly strong magnetic force from the standpoint of cost and weight. In addition, when the mat is adhered using a magnetically active material having a particularly strong magnetic force, it becomes difficult to maintain uniformity of adhesion. Moreover, once the mat becomes wrinkled, the strong magnetic forces then tend to oppose any subsequent smoothing action intended to remove the wrinkles.

Because of such circumstances, magnetic force has not yet been practically utilized for fixing the mat to the base though many proposals have been made regarding the use of magnetic force.

SUMMARY

The object of the present invention therefore is to provide a separable mat having an attachment mechanism that is free from the problems associated with the attachment mechanisms discussed above. By use of the magnetic attachment mechanism discussed herein, the fabric portion of the separable mat may be readily removed for washing or replacing. The fabric portion is unburdened by heavy, bulky, or inflexible features or devices that would interfere with the smooth surface of the mat when in place, and that would contribute to excessive bulk or weight. Importantly, the strength of the attachment between the fabric and base portions of the separable mat is strong and is stable with respect to environmental conditions (e.g., rain, sunlight, dust, etc.).

According to one embodiment as will be described herein, there is provided a separable mat comprising a textile component and a base component having a substantially flat surface for supporting the textile component. The textile component has a primary backing substrate, in which textile yarns are implanted or to which yarns are otherwise attached, and may include a magnetically active or (generally preferred) magnetically passive composition or structure applied to or made a part of the backing substrate or some other element comprising the textile component.

Accordingly, the magnetically interactive composition or structure applied to or made a part of the primary backing substrate (or other part) of the textile portion of the separable mat can be either magnetically active (e.g., magnetic particles or thin magnets in the form of disks or small plates or sheet segments) or magnetically passive (i.e., a material that is attracted to a magnet, such as iron particles or disks or small plates or sheet segments comprised of a material that is attracted to a magnet). Alternately, the textile component may include additional backing substrates or layers, one or more adhesive layers, or other structural elements to which magnetically interactive structures such as individual segments of flexible magnetic sheeting, individual ceramic magnets, magnetic particles, or other kinds or forms of magnetically active materials, or, alternatively, magnetically passive structures comprised of particles, sheets, plates, coatings, or the like comprised of materials that are attracted to magnets. It is contemplated that any such magnetically active or passive structures may be secured to or with the textile portion of the separable mat by encapsulation, by being placed into secure pockets formed in the mat, or by other suitable means.

In either case, the location of the magnetically interactive material in the textile portion of the separable mat should correspond to locations of magnetically complementary materials on the base portion of the separable mat, so that the magnetically interactive materials in the textile portion and corresponding magnetically complementary areas on the base portion are in substantial alignment when the textile portion is properly installed on the base portion. It is contemplated that, in order to maximize the versatility and placement flexibility of such separable mats, the base portion could contain a sheet of magnetically interactive material, preferably a magnetically active material, that provides a suitable magnetically complementary surface across the entire surface of the base with which the textile portion comes into contact when properly installed in the base portion. This would allow the same base to be used with textile portions having different arrangements or configurations of magnetically interactive structures, without regard to where the magnetically interactive structures are positioned on the textile portion of the separable mat.

Variations contemplated include multiple textile portions being attached to a single base portion, and variations in the number of magnetically interactive structures and their location, configuration, and means or nature of attachment to the mat, including variations as to the specific layer or portion of the separable mat to which they are attached, as will be discussed in more detail hereinbelow. The mat component may be dyed or printed to meet user specifications, and the base component may also be colored if so desired.

The separable mat described herein uses magnetic force to maintain secure attachment between the removable textile portion of the mat and the normally stationary base portion of the mat, an attachment mechanism that has been found to be generally immune to many of the physical and environmental demands—rain, dust, dirt, repeated launderings, folding, rough or penetrating shoe heels or soles, etc. Unlike the approach used by others, the magnetically interactive structures described herein are not in the form of continuous, full size sheets, but rather in the form of discrete elements that are strategically placed around the edges of the textile portion of the mat, or elsewhere, as desired. By avoiding the use of continuous, full size sheets of magnetically interactive material, particularly in the textile portion of the mat, considerable savings can be achieved in terms of weight, bulk, fabrication costs, ease of laundering, etc.

BRIEF DESCRIPTION OF DRAWINGS

FIGS. 1 through 7 depict various embodiments of the textile portion of a separable mat constructed in accordance with the teachings herein. In these and other Figures, features carrying the same call-out number may be of the same or similar construction and/or composition, but need not be.

FIGS. 8 through 11 depict alternative magnetically interactive structures applicable to the teachings herein.

FIGS. 12 through 16 depict various embodiments of base portions of separable mats constructed in accordance with the teachings herein.

DETAILED DESCRIPTION

The separable mat of the present disclosure comprises a textile portion having yarns attached thereto and to which a magnetically interactive material has been affixed, and a complementary base portion that is dimensioned and configured to accommodate the textile portion and thereby form a complete mat structure. Magnetically complementary materials in the base portion, located or configured in a way that facilitates interaction with the magnetically interactive materials associated with the textile portion, serve to provide a releasable attachment mechanism to secure the textile portion to the base portion when the mat is in use.

Some contemplated variations of this concept are discussed below.

Variations in aspects of separable mat construction include those constructions set forth in FIGS. 1 through 16. FIG. 1 shows one example of a textile portion of a separable mat constructed in accordance with the teachings herein. Fabric 5, which can be comprised of yarns of nylon, polyester, acetate, polypropylene, cotton, wool, acrylic, or other suitable material, or combinations thereof, is attached (e.g., by stitching, tufting, etc.) to a primary backing 10 that can be comprised of a knit, woven, or non-woven structure of nylon, polyester, acetate, polypropylene, acrylic, cotton, wool, or a combination thereof, although the use of nylon or polyester knit fabric is preferred. The textile fabric 5 and the primary backing 10, collectively referred to as the fabric/backing structure and indicated at 15, are then affixed to an adhesive layer 25 comprised of rubber, urethane, polypropylene, polyethylene, nylon, polyester, acetate, acrylonitrile-butadiene-styrene, polyvinyl chloride, and other thermoplastic elastomers or thermoset plastics, or combinations thereof. Hereinafter, this combined structure, indicated at 30 in FIGS. 2 through 7, shall be referred to as the "fabric/adhesive composite structure." Effectively encapsulated between the primary backing 15 and adhesive layer 25 is an array of individual magnetically interactive structures 20 (which can be comprised of magnetically active or magnetically passive materials), configured in the form of a border positioned somewhat inboard from the edge of the textile portion and located immediately under the fabric/adhesive composite structure. Although inboard positions from about 2 millimeters to about 5 or 10 milllimeters are generally preferred, inboard positions from about 1 millimeter to about 50 millimeters from the edge may be used, with relative positions outside these ranges perhaps being appropriate for certain textile portion constructions, base portion constructions, or end-use environments.

In FIG. 2, the fabric/adhesive composite structure 30, with similarly configured magnetically interactive structures 20, is attached to a second adhesive layer 35 so as to effectively encapsulate the magnetically interactive structures 20 arranged around the perimeter of the underside of the fabric/adhesive composite structure 30. The second adhesive layer 35 is configured generally in the form of the arrangement selected for the magnetically interactive structures 20 (e.g., as shown, the magnetically interactive structures 20 are arranged in a configuration that forms a border, slightly inboard of the outside edge of the fabric/adhesive composite structure 30, and the second adhesive layer 35 is configured as a corresponding frame-like rectangle corresponding to that configuration). This second adhesive layer 35 effectively encapsulates or otherwise immobilizes the magnetically interactive structures on the underside of the fabric/adhesive composite structure.

In FIG. 3, the fabric/adhesive composite structure 30 of FIG. 2, with similarly configured magnetically interactive structures 20, is combined with a full size secondary backing 40, which may be constructed from among the same group of materials, and from among the same method of construction as was discussed in connection with the primary backing 10 described in FIG. 1. This secondary backing fabric or scrim 40 effectively encapsulates the magnetically interactive structures 20 (which, as before, can be comprised of magnetically active or magnetically passive materials), and is shown extending the length and width of the fabric/adhesive composite 30.

In the structure shown in FIG. 4, the fabric/composite structure 30 of FIG. 2 is augmented by a secondary backing layer 40, which may be constructed from among the same group of materials, and from among the same methods of construction as was discussed in connection with the primary backing 10 described in FIG. 1. Secondary backing 40 is shown completely covering the adhesive surface of the fabric/composite structure 30, i.e., it extends substantially for the entire length and width of the textile portion of the mat. As shown, below this secondary backing layer 40 are arranged a plurality of magnetically interactive active structures 20. In this configuration, however, the magnetically active structures are held in place by a secondary adhesive layer 35, positioned below the secondary first backing layer 40 and dimensioned to cover entirely the secondary backing layer, that effectively encapsulates magnetically interactive structures 20.

The structure shown in FIG. 5 is similar to the structure of FIG. 4, except that a full size tertiary backing layer 45 is substituted for the secondary adhesive layer 35, and the contiguous, full size secondary and tertiary backing layers 40, 45 serve to "sandwich" the magnetically interactive structures 20 along the perimeter of the textile portion of the separable mat.

The structure in FIG. 6 also employs a full size secondary backing layer 40, but the tertiary backing layer 45, as well as the intervening second adhesive layer 35, are configured to conform to the arrangement of the magnetically interactive structures 20, as described in connection with FIG. 2. Accordingly, layers 35 and 45 are shown in a border or frame-like configuration.

The structure shown in FIG. 7 is analogous to that shown in FIG. 6, except that the secondary adhesive layer 35 and the tertiary backing layer 45 are full-sized, i.e., they extend the length and width of the textile portion. This structure, as well as those shown in FIGS. 1, 3, 4, and 5 accommodates placement of magnetically interactive structures throughout the plane of the textile portion, i.e., in areas apart from the edge of the textile portion, and thereby allows a greater degree of flexibility in the placement of the magnetically interactive structures associated with the textile portion of the separable mat.

For example, the structures may be placed in a border-like configuration, but, to ensure that ripples do not develop in any areas of the mat, additional magnetically active structures may be positioned in various locations in or near the central areas of the textile portion, either singly or as part of a small group (perhaps arranged in a rectangular or circular array), or as part of a larger overall design, such as a pair of intersecting lines extending along the principal diagonals of the carpet mat, thereby forming an "X" pattern. Other configurations, such as ovals, circles, etc., arranged singly or in nested groups, are also contemplated. However, configurations that assure secure attachment of the carpet portion to the base portion along edges and at corners are preferred. Several such configurations are depicted, as examples only, in FIGS. 8 through 12. In these drawings, features indicated by dashed lines, by shading, and identified with letters are intended as independently optional configurations.

Spacing between adjacent individual magnetically interactive structures is significant to the extent that rippling and unintended detachment of the textile portion of the mat from the base portion of the mat is to be avoided. Accordingly, close spacing of the individual magnetically interactive structures, resulting in relatively small gaps, is recommended. As an example only, it is foreseen that spacings within the range of from about 1 millimeter to about 10 centimeters, and preferably within the range of from about 2 to about 10 to 15 millimeters, may be used, although spacings (uniform or non-uniform) anywhere within these ranges, and perhaps somewhat outside such ranges, may be found to be acceptable or even preferred in some applications. For example, it is contemplated that the individual magnetically interactive structures may be arranged in a contiguous configuration, thereby having substantially no spacing between adjacent structures, as depicted in FIG. 10. It is also contemplated that, where such contiguous configuration is desired, continuous strips of magnetically interactive material can be used rather than contiguously spaced individual elements, as indicated at 23 in FIG. 12.

Alternatively, variations from the structures described above are contemplated. For example, the magnetically interactive structures, particularly the magnetically active structures, may be affixed to the textile portion of the separable mat through the use of pockets formed, for example, in the backing material. This would allow for the magnetically active structures to be removed from the textile substrate prior to laundering.

FIGS. 13 through 16 depict various base portion configurations that can be considered for use with the magnetically interactive textile portions discussed above. The base portion is preferably of a shape that complements the shape of the textile component (or components) that are to be used with it. Accordingly, it is typically rectangular. In any case, its edges typically extend laterally beyond the edges of the textile portion of the mat and, in one embodiment, form a recess into which the textile portion of the mat may more-or-less precisely fit, as shown at 68 in FIG. 14. The base portion may have a lip portion around its perimeter, as shown at 78 in FIG. 16, to capture dirt or water from users' footwear. Alternatively, the base component may be substantially flat across its surface for use in areas where low clearance is needed, as depicted in FIG. 13. In yet another embodiment, the base portion may contain a plurality of recesses or planar areas, depicted at 72 in FIG. 15, into which a corresponding number of individual textile components may be respectively secured using one or more arrays or configurations of individual magnetically interactive structures as described herein.

The magnetically interactive structures discussed above are intended to be configured in complementary pairs, so that one structure on the textile portion of the mat is positioned directly adjacent to a magnetically complementary structure positioned on the base portion of the mat. One such structure must be magnetically active (i.e., a magnetic field generator); the magnetically complementary structure may be either magnetically active (but of the proper magnetic polarity so as to generate a net attractive, rather than a repulsive, force) or may be merely magnetically passive (e.g., an iron plate, encapsulated iron dust, etc.). The choice as to which type of structure (i.e., magnetically active or passive) to position in which mat portion (textile or base) depends upon several factors, including the availability of suitably thin, lightweight magnetically active materials.

Generally, it is expected that placement of the heavier, bulkier magnetically interactive structures (which are usually magnetically active structures) in the base will be advantageous, thereby maximizing the advantages of using magnetically interactive structures that are likely to be relatively small, lightweight, flexible, and discrete (which are usually magnetically passive structures) in the removable textile portion of the separable mat. By so doing, it is expected that the textile portion of the mat can remain relatively lightweight and flexible, and will present no special laundering problems (such as magnets being attracted to the laundering equipment drums or the magnets dislodging themselves from the textile portion of the mat during the laundering process). However, the choice as to whether to include magnetically active structures in the textile portion of the mat, either instead of or in addition to placement of magnetically active structures in the base portion of the separable mat, may be dictated by the demands of the application—if, for example, the textile portion of the mat was going to be subjected to high lateral forces, the appropriate choice might be to use magnetically active structures in both the textile portion and the base portion of the mat, to assure the security of the attachment.

What is claimed is:

1. A floor mat with separable components, said floor mat comprising a first component that acts as a base component of said floor mat, said base component being adapted to lay on a floor and be readily removable therefrom, and at least one second component, said second component being a textile component, wherein said textile component comprises (a) a textile upper surface having a backing substrate and mat piles implanted in said backing substrate, (b) an adhesive layer, and (c) at least one magnetic constituent, and said base component includes a magnetic constituent such that said textile component and said base component are magnetically complementary, and wherein said base component has edges that extend laterally beyond the edges of said textile component and has raised portions around the perimeter of said base component and on the upper surface thereof, said raised portions forming a recess into which said textile component is positioned.

2. The floor mat of claim 1, wherein said textile component includes at least one magnetically active constituent adhered to the backing substrate, said magnetically active constituent being selected from the group consisting of magnetic particles, magnetic disks, and magnetic sheets, and wherein said base component includes a magnetically passive constituent.

3. The floor mat of claim 1, wherein said textile component includes a magnetically passive constituent and wherein said base component includes at least one magnetically active constituent adhered to the upper surface of said base component, said magnetically active constituent being selected from the group consisting of magnetic particles, magnetic disks, and magnetic sheets.

4. The floor mat of claim 1, wherein said textile component includes a magnetic film adhered to the backing substrate and wherein said base component includes magnetic particles incorporated therein.

5. The floor mat of claim 1, wherein said textile component includes a magnetically active constituent adhered to the backing substrate and wherein said base component includes a magnetically active constituent.

6. The floor mat of claim 1, wherein said textile component comprises a plurality of magnetic constituents that are positioned inboard of the periphery of textile component.

7. The floor mat of claim 6, wherein said magnetic constituents are positioned from about 2 millimeters to about 10 millimeters from the edge of said textile component.

8. The floor mat of claim 1, wherein said base component comprises a plurality of recesses into which a corresponding plurality of said textile components is positioned.

* * * * *